Patented Oct. 7, 1930

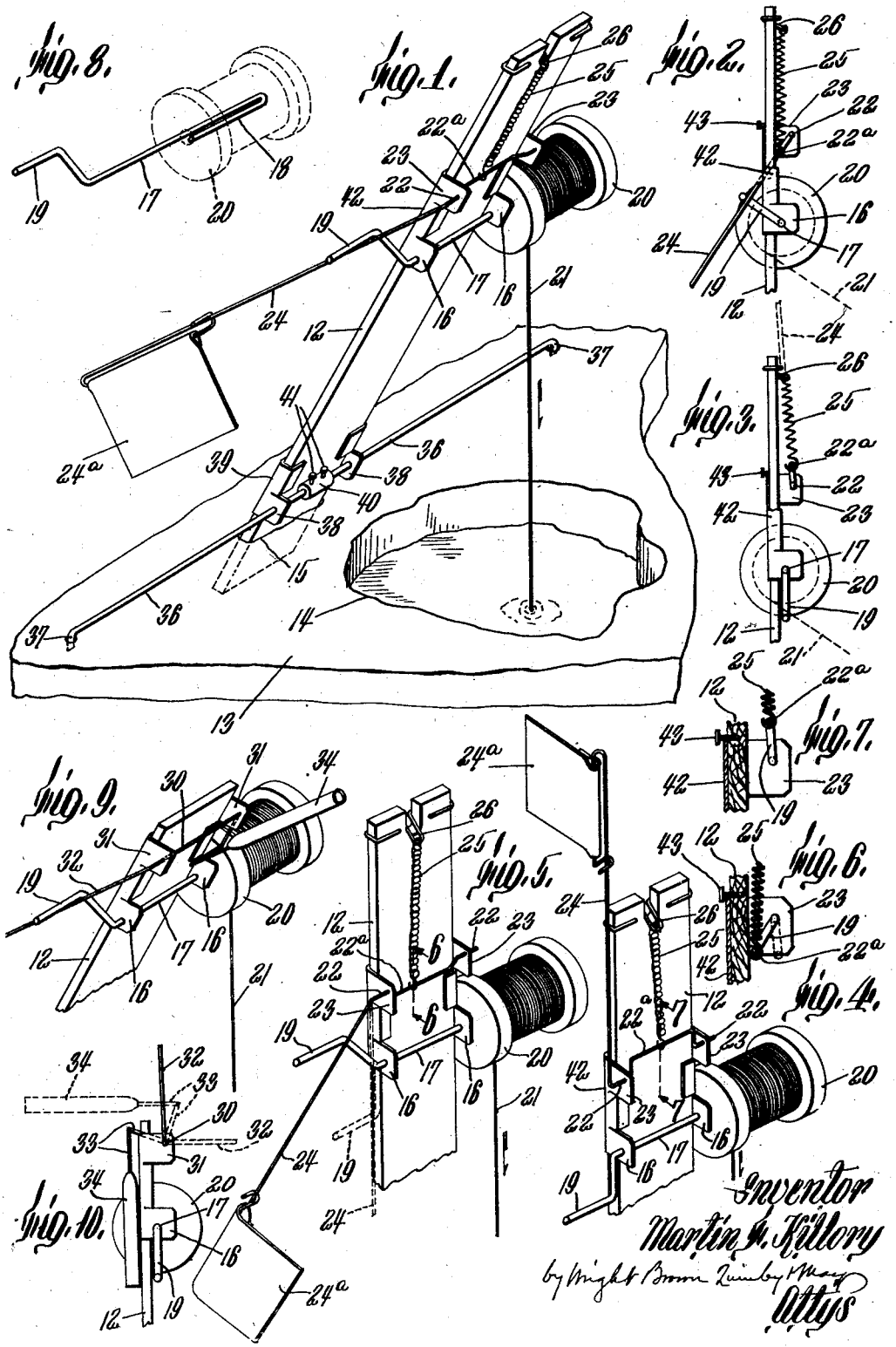

1,777,496

UNITED STATES PATENT OFFICE

MARTIN F. KILLORY, OF BROCKTON, MASSACHUSETTS

FISHING TRAP

Application filed January 21, 1930. Serial No. 422,315.

This invention relates to appliances used in fishing through an ice floor on a body of water. An appliance embodying the invention includes a standard adapted to be supported in an upstanding position on an ice floor, a reel shaft journaled in bearings on the standard, a reel fixed to the shaft to rotate the shaft and be rotated thereby, a fish line wound on the reel and adapted to depend therefrom through a hole in the ice floor, a signal carrier oscillatable on the standard and carrying a signal such as a flag, and means adapted to hold the signal alternately in a retracted or practically concealed position, and in a projected or displaced position, said means being adapted to hold the carrier with the signal concealed until a hook on the line is taken and the line pulled downward by a fish, and to shift the carrier to display the signal when a pull is exerted by a fish on the line.

The object of the invention is to provide a simple and durable fishing trap adapted to be quickly and conveniently set for action, the signal being retracted, and to quickly project the signal to indicate the fact that a fish has taken the hook.

Of the accompanying drawings forming a part of this specification,—

Figure 1 shows in perspective a fishing trap embodying the invention, set for action, the signal being retracted.

Figure 2 is an edge view, showing a portion of the trap conditioned as shown by Figure 1.

Figure 3 is an edge view, showing a portion of the trap conditioned to project the signal.

Figures 4 and 5 are perspective views, showing portions of the trap, Figure 4 showing the trap conditioned as shown by Figure 3, while Figure 5 shows the trap conditioned as shown by Figures 1 and 2.

Figure 6 is a fragmentary section on line 6—6 of Figure 5.

Figure 7 is a fragmentary section on line 7—7 of Figure 4.

Figure 8 shows in perspective and by full lines, the reel shaft, and by dotted lines the reel shown by preceding figures.

Figure 9 is a fragmentary perspective view, showing a modification.

Figure 10 is a fragmentary edge view, showing the modification shown by Figure 9.

The same reference characters indicate the same parts in all of the figures.

Referring first to Figures 1 to 8, showing the preferred embodiment, 12 designates a standard which is preferably a flat sided strip of hard wood, adapted to be located in an upstanding position on an ice floor 13, beside a hole 14 therein, one end of the standard being inserted, in this instance, in an inclined slot 15 cut in the ice, the standard being inclined and overhanging the ice floor.

Journaled in bearings formed in ears 16 on the standard is a reel shaft 17, having end portions 18 and 19 (Figure 8) projecting in opposite directions from the standard. On the portion 18 is fixed a reel 20, on which a fish line 21 is wound. The shaft is preferably a metal rod bent to the form shown by Figure 8, the portion 18 being doubled or looped, and resiliently expansible to enter and frictionally engage the bore of the reel 20, so that a downward pull on the line 21 will partly rotate the reel and shaft, the reel being preferably a wooden spool. The portion 19 is a crank which is offset from the journaled portion of the shaft and is adapted to serve both as a stop for the signal arm hereinafter described, and as a crank whereby the shaft may be rotated to wind up the line 21.

A signal carrier is mounted on the standard 12 and is composed of a shaft member including portions 22 journaled in bearings formed in ears 23 on the standard, and an offset portion 22ª, and an arm member 24 provided with a signal 24ª, such as a flag, and arranged substantially at right angles with the shaft portion, as best shown by Figure 4. The arm member 24 is oscillatable in a predetermined path into which the crank 19 of the reel shaft projects, said crank serving as a stop for the arm member, limiting movement of the latter in one direction, as indicated by Figures 1, 2 and 5.

The line 21 depends from the reel in position to cause rotation of the reel and the reel shaft 17 in a direction causing the crank 19 to partly oscillate or project the carrier arm 24 from the position shown by full lines to that shown by dotted lines in Figure 5, when a downward pull is exerted on the line by a fish.

The trap includes carrier-actuating means organized to yieldingly press the signal arm 24 against the crank 19, when the line is free, and complete the projection of the arm from the dotted line position shown by Figure 5, to the full line position shown by Figure 4, after the reel shaft is rotated by a pull on the line.

In this instance, the carrier-actuating means is provided by the offset portion $22^a$ of the carrier-shaft member, and a contractile spring 25 engaged with said offset portion and with an anchoring member 26, fixed to the standard.

To set the trap for action the fisherman manually swings the signal arm 24 from the projected position shown by Figure 4, to the retracted position shown by Figure 5. This movement turns the offset portion $22^a$ to the full line position shown by Figures 5 and 6, and both tensions and shifts the spring 25 so that the stress thereof holds the arm 24 in yielding contact with the crank 19, which is now in position to prevent further retraction of the signal arm.

When the reel and crank are rotated by a downward pull exerted on the line by a fish, the crank partly projects the signal arm to the dotted line position shown by Figure 5, the offset portion $22^a$ of the carrier-shaft member being at the same time moved to the dotted line position shown by Figure 6, this movement permitting the tensioned spring 25 to contract and raise the offset portion $22^a$ to the position shown by Figures 4 and 7, thus completing the projection of the signal arm and signal to the position shown by Figure 4.

Figures 9 and 10 show a modified form of the carrier-actuating means, a weight being substituted for the spring 25. In this modification the structure differs from that above described as follows:

The signal carrier includes a shaft member 30, journaled in bearings in ears 31, and a signal-carrying arm member 32, at right angles to the member 30. The shaft member 30 is provided with a bent arm 33, having an enlargement 34, constituting a weight. When the carrier arm 32 is manually retracted and contacts with the crank 19, of the reel shaft as before described, the weight 34 is in the position shown by Figure 9, and acts to press the arm 32 against the crank. When the shaft 17 is rotated by a pull on the line 21, the crank 19 partly projects the signal arm until the weight 34 reaches substantially the position shown by dotted lines in Figure 10. The weight then falls to the position shown by full lines and completes the projection of the signal.

To prevent the standard 12 from tipping edgewise from the position shown by Figure 1, I provide elongated arms 36, engaged with the lower end portion of the standard and projecting laterally from opposite edges thereof, the outer ends of said arms having dogs 37 adapted to penetrate the ice floor. Said arms are inserted in ears 38 on a holder 39, which is slidable on to the lower end of the standard. The arms 36 may be coupled together between the ears 38, by a sleeve 40, having set screws 41. The ears 16 and 23 are formed on a holder 42, which is slidable on the standard to any desired position, the tension of the spring 25 being variable by sliding the holder to different positions. When the spring is suitably tensioned, a stop such as a nail or screw 43 may be engaged with the standard in position to cause the upper end of the holder 42 to be held by the spring against it, the tension of the spring being determined by the location of the stop.

It will be seen that the operation of setting the trap as indicated by Figures 1, 5 and 9, is extremely simple and involves only the swinging of the signal arm by hand against the crank 19.

It will also be seen that when the signal is projected, the crank 19 is free to be rotated to take up the submerged portion of the line 21.

The set screws 41 project from the sleeve 40 and are adapted to bear on the standard 12 to prevent the dogs 37 from pointing in an upward direction.

I claim:

1. A fishing trap comprising a standard, a reel shaft journaled in bearings thereon and provided with a reel and a crank, a signal carrier including a shaft member journaled in bearings on the standard, and an arm member having a signal and oscillatable to alternately retract and project the signal, the reel shaft crank projecting into the path of said arm, so that when the arm is manually retracted, the crank constitutes a stop limiting such retraction, a line engaged with the reel and depending therefrom in position to cause rotation of the reel shaft in a direction causing the crank to partly project the carrier arm when a downward pull is exerted on the line of a fish, carrier-actuating means organized to yieldingly press the signal arm against the crank when the line is free, and complete the projection of said arm when the reel shaft is rotated by a pull on the line, a holder slidable on to the lower end portion of the standard and provided with ears projecting from one of its sides, said ears having orifices therein an elongated arms inserted in the orifices in said ears and projecting laterally from opposite edges of the standard, said arms being provided at their outer ends with dogs adapted to penetrate an ice floor.

2. A fishing trap comprising a standard, a reel shaft journaled in bearings thereon and provided with a reel and a crank, a signal carrier including a shaft member journaled in bearings on the standard, and an arm member having a signal and oscillatable to alternately retract and project the signal, the reel shaft crank projecting into the path of said arm, so that when the arm is manually retracted, the crank constitutes a stop limiting such retraction, a line engaged with the reel and depending therefrom in position to cause rotation of the reel shaft in a direction causing the crank to partly project the carrier arm when downward pull is exerted on the line, the shaft member of the carrier having an offset portion, and a contractile spring engaged at one end with said offset portion and at the other end with the standard, said offset portion and spring constituting a carrier-actuating means organized to yieldingly press the signal arm against the crank when the line is free, and complete the projection of said arm when the reel shaft is rotated by a pull on the line, the reel and carrier shaft bearings being formed in ears on a holder which is slidable on said standard, the standard being provided with a stop against which one end of the holder is held by said spring, the tension of the spring being determined by the location of the stop.

In testimony whereof I have affixed my signature.

MARTIN F. KILLORY.